(12) United States Patent
Mahapatra et al.

(10) Patent No.: US 9,722,946 B1
(45) Date of Patent: Aug. 1, 2017

(54) APPARATUS AND METHOD FOR A SCRIPT EXECUTION CONTROL ENVIRONMENT

(71) Applicant: VCE Company, LLC, Richardson, TX (US)

(72) Inventors: Akshaya Mahapatra, San Jose, CA (US); Michael Tan, Palo Alto, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 149 days.

(21) Appl. No.: 14/537,437

(22) Filed: Nov. 10, 2014

(51) Int. Cl.
*G06F 15/173* (2006.01)
*H04L 12/911* (2013.01)

(52) U.S. Cl.
CPC .................... *H04L 47/70* (2013.01)

(58) Field of Classification Search
CPC ....... H04L 41/08; H04L 69/18; H04L 67/025; H04L 67/00; G06F 9/45558; G06F 9/5072
USPC .......................................................... 709/226
See application file for complete search history.

(56) References Cited

U.S. PATENT DOCUMENTS

| 2014/0075431 | A1* | 3/2014 | Kumar | G06F 8/61 717/175 |
| 2014/0189125 | A1* | 7/2014 | Amies | G06F 9/45558 709/226 |
| 2014/0278623 | A1* | 9/2014 | Martinez | G06F 8/36 705/7.12 |
| 2015/0007171 | A1* | 1/2015 | Blake | G06F 9/45537 718/1 |
| 2016/0050125 | A1* | 2/2016 | Mattson | H04L 41/5051 709/225 |

* cited by examiner

*Primary Examiner* — Joseph Greene
(74) *Attorney, Agent, or Firm* — Polsinelli PC

(57) ABSTRACT

A computing environment provisioning system includes a processing system and a memory for storing a locking service that is executed by the processing system to receive multiple provisioning requests from one or more provisioning scripts for provisioning multiple resources to be provided by one or more physical hosts or one or more virtual objects of a computing environment in which at least one resource being dependent upon operation of one or more of the other resources. The locking service may then identify the other resources that are required to be provisioned prior to the dependent resource being provisioned, and inhibit provisioning of the dependent resource until the other resources have been successfully provisioned.

18 Claims, 8 Drawing Sheets

APPARATUS AND METHOD FOR A SCRIPT EXECUTION CONTROL ENVIRONMENT

TECHNICAL FIELD

Aspects of the present disclosure relate to computing devices and, in particular, to an apparatus and method for a script execution control environment.

BACKGROUND

Computing resources used by enterprises, such as corporations and universities, are often provided by multiple computing devices (e.g., hardware resources) that function in a collaborative manner to meet the computing resource needs of the enterprise. Early integration of computing devices to achieve such collaboration was relatively complex and difficult due to many reasons including the relative independence of the various technologies. To remedy these problems and make compute collaboration more efficient, among other advantages, converged infrastructures were introduced that provided a standardized package of components combined into a single, optimized computing solution. Converged infrastructures commonly used today are implemented with a virtual computing environment that includes a structured combination of multiple virtual objects that are executed on independently functioning hardware resources commonly referred to as hosts. To deploy a converged infrastructure, one or more scripts are executed that perform various functions, such as installation of applications on the hardware and software resources as well as setting of various parameters to be used by the resources of the converged infrastructures.

SUMMARY

According to one aspect of the present disclosure, a converged infrastructure provisioning system includes a processing system and a memory for storing a locking service that is executed by the processing system to receive multiple provisioning requests from one or more provisioning scripts for provisioning multiple resources to be provided by one or more physical hosts or one or more virtual objects of a converged infrastructure in which at least one resource being dependent upon operation of one or more of the other resources. The locking service may then identify the other resources that are required to be provisioned prior to the dependent resource being provisioned, and inhibit provisioning of the dependent resource until the other resources have been successfully provisioned.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Embodiments of the present disclosure provide a system for provisioning resources of a computing environment such that any dependencies of the environment's resources are managed in a structured and organized manner. Many computing environments often include numerous hardware resources (e.g., hosts) and virtual objects (e.g., virtual machines, virtual storage units, and virtual switches) that function in a collaborative manner to accomplish various tasks. In many instances, dependencies exist among resources where the operation of certain resources depends upon the operation of other resources. That is, provisioning of resources in such an environment may be conducted in a sequenced and/or hierarchal manner to ensure that all dependencies are resolved as each resource is provisioned. Embodiments of the present disclosure provide such functions, among others, using a locking mechanism that allows multiple scripts to be simultaneously executed while ensuring any dependencies for each resource are properly managed.

Figure 1A:
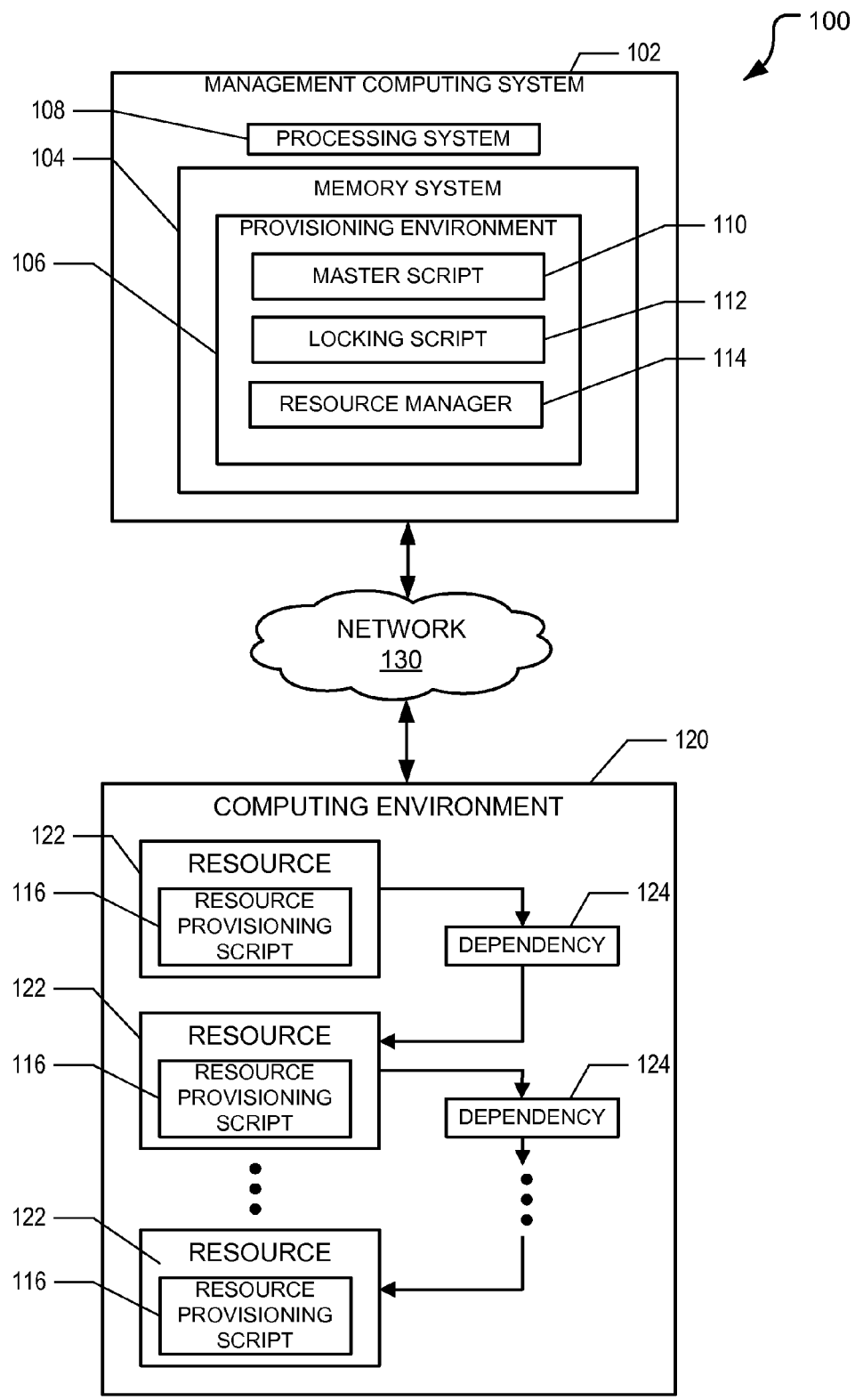
FIG. 1A illustrates an example script execution provisioning system according to the teachings of the present disclosure.

FIG. 1A illustrates an example script execution provisioning system 100 according to the teachings of the present disclosure. The system 100 includes a management computing system 102 that includes a memory system 104 for storing a computing environment (C/E) provisioning environment 106 that is executed by a processing system 108. The environment 106 includes a master script 110, a locking service 112, and a resource manager 114. The locking service 112 communicates with a computing environment 120 to manage the provisioning of the computing environment 120 using resource provisioning scripts 116 configured on resources 122 of the computing environment 120. As will be described in detail below, the locking service 112 coordinates the operation of the provisioning scripts 116 to ensure that dependencies 124 for each resource 122 are handled in a structured, organized manner.

In a specific example of a computing environment 120 that includes a converged infrastructure (CI), the resources 122 may include hardware resources (e.g., hosts 206) and/or virtual resources (e.g., virtual machines 208a, virtual switches 208b, and/or virtual storage objects 208c) executed by the hosts 206 of the converged infrastructure (See FIG. 2). In general, provisioning of a computing environment 120 may incur a myriad of dependencies 124 that require a sequenced provisioning of its resources to avoid data corruption. For example, a typical computing environment 120 may have over 3,000 virtual objects that each executes over 20 physical objects. Embodiments of the present disclosure provide a provisioning environment 106 that incorporates a locking service 112 that is accessed as the scripts 116 are executed such that provisioning of the resources occurs in a structured, ordered sequence.

One example of a dependency 124 may include one that requires a host 206 to be provisioned prior to a virtual object that is to be executed on that host be provisioned. Thus, that virtual object is considered to be a dependent resource of its associated host. Another example dependency 124 may include one that requires a virtual storage object 208c be provisioned prior to a virtual switch 208b being allocated to that provisioned virtual storage object 208c. Thus, the virtual switch 208b is considered to be a dependent resource of that virtual storage object 208c. Additional example dependencies will be described in detail herein below.

A script generally refers to a combined set of instructions that, when executed by a computer, perform various functions in association with the computing system they are executed on. The functions performed may include, for example, launching applications, setting environment variables of the operating system and/or hardware components of the computing device, and even calculating values to be used for setting the environment variables. In one embodiment, the scripts comprise an alpha-numeric document file that including multiple instructions. When executed, each instruction is interpreted by the operating system in which it is executed. In one aspect, each instruction generally includes a command with one or more arguments that is interpreted by the operating system (e.g., run-time environment) that could otherwise be executed one at a time via a terminal of the operating system.

The master script 110 manages the execution of the provisioning scripts 116 in the computing environment 120. For example, the master script 110 includes information associated with each provisioning script such that when it is executed, the master script 110 issues instructions to initiate execution of each of the provisioning scripts 116 in a specified, structured order. The master script 110 may initiate execution of only one, some, or all of the provisioning scripts 116 at a time. That is, the master script 110 may be configured to simultaneously execute a certain quantity and type of provisioning scripts 116 simultaneously such that the amount of time required for provisioning any given computing environment 120 may be reduced.

The locking service 112 provides for the simultaneous execution of multiple provisioning scripts 116 by locking certain resources from being provisioned based upon any dependencies associated with those resources. In one embodiment, the locking service 112 is implemented as a set of instructions written in a language, such as Java or C++, although any suitable language may be used that implements the features described herein. In general, the locking service 112 may be called by the provisioning scripts as they are executed to lock out provisioning of dependent resources until those resources are successfully provisioned, thus avoiding race conditions associated with simultaneous provisioning of dependent resources. In one embodiment, the locking service 112 communicates with each provisioning script 116 using a representational state transfer (REST) application program interface (API) that receives locking requests from each provisioning script 116 and issues a lock upon that resource until the required resource is fully provisioned.

The locking service 112 may perform several types of locking techniques. In one embodiment, the locking service 112 performs a basic locking technique of resources in which a script may inhibit multiple other scripts from provisioning a resource until the lock is removed. The basic locking technique includes an acquire lock method that provides a unique identifier (e.g., an alpha-numeric code name) that, when other scripts attempt to provision the resource with that unique identifier, those scripts are inhibited from doing so. The basic locking technique also includes a release lock method that releases the lock so that another script may acquire the lock with that name.

In another embodiment, the locking service 112 performs a latch locking technique in which tasks are inhibited from provisioning resources until a specified quantity of other scripts have been completed. The latch locking technique include a latch down counter and a latch name that when received by the locking service 112, generates a down counter that inhibits other scripts from provisioning their resources until the down counter reaches a '0' or other specified value. The latch locking technique also includes a latch down counter decrement instruction that may be invoked by the scripts to instruct the locking service 112 to decrement the generated latch down counter. Once all tasks are done, they will all decrement number of tasks the countdown latch is waiting for so that the script waiting for the latch can proceed.

In yet another embodiment, the locking service 112 performs a barrier locking technique in which a group of tasks may be inhibited from provisioning their resources until a certain script has been completed. The barrier locking technique includes a barrier create instruction that, when invoked by a script, creates a barrier to other scripts requesting a lock using a name associated with the barrier lock. The barrier locking technique also includes a barrier wait instruction that, when invoked by other scripts, causes the script to wait pending the release of the barrier lock by the script that created the lock. The barrier locking technique also includes a barrier remove instruction that causes the barrier lock to be removed when invoked by the script that created the barrier lock.

The resource manager 114 manages the allocation of available resources in the computing environment 120. For example, the resource manager 114 may, upon request from a provisioning script 116, allocate a certain size and type of memory to be used by a resource associated with the provisioning script 116. In one embodiment, the resource manager includes an element manager, such as VCENTER™, which is available from VMware, Incorporation, in Palo Alto, Calif.

The management computing system 102 includes a processing system 120 that executes the environment 106 stored in a volatile or non-volatile memory 104. The management computing system 102 may include any type of computing system, such as one or more management computing systems, personal computers, mobile computers and/or other mobile devices, and other hosts. The management computing system 102 may communicate with the computing environment 120 via wireless and/or wireline communications.

The management computing system 102 and the computing environment 120 communicate with one another in any suitable manner, such as using wireless, wired, and/or optical communications. In one embodiment, the management computing system 102 and the computing environment 120 communicates with one another using a communication network 130, such as the Internet, an intranet, or another wired and/or wireless communication network. In another embodiment, the management computing system 102 and computing environment 120 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the management computing system 102 and computing environment 120 may communicate with one another without the use of a separate and a distinct network. Although only one computing environment 120 is shown herein, it is contemplated that embodiments of the provisioning environment may be applied to any quantity of computing environments 120, such as two or more computing environments 120.

Figure 1B:
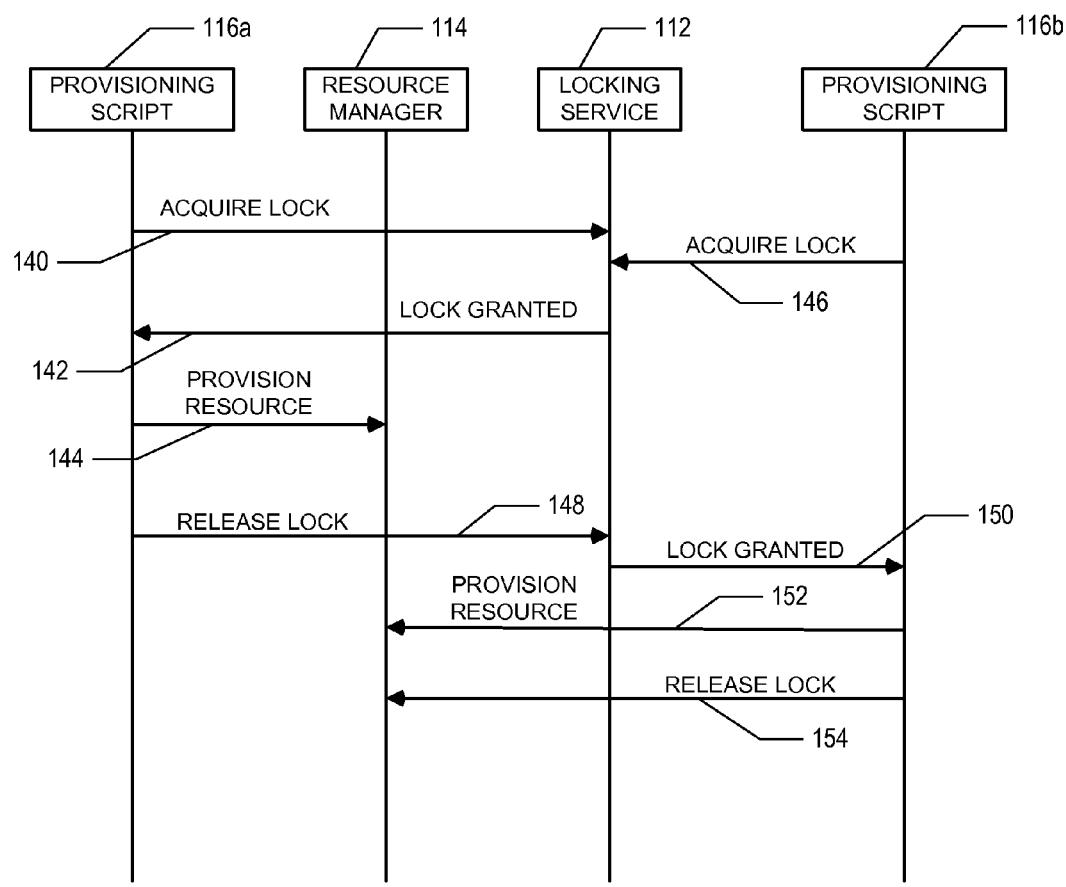
FIG. 1B illustrates an example timing diagram showing how the locking service may provide a structured sequence of provisioning for multiple simultaneously executed provisioning scripts according to one embodiment of the present disclosure.

FIG. 1B illustrates an example timing diagram showing how the locking service 112 may provide a basic locking technique for multiple simultaneously executed provisioning scripts. Initially, two provisioning scripts 116a and 116b are shown that are executed simultaneously.

In step 140, a first provisioning script 116a transmits a request for a lock from the locking service 112, and receives a response message indicating that a lock has been granted by the locking service 112 in step 142. Because the first provisioning script 116a has been granted the lock, it can proceed to access the resource manager 114 to provision its associated resource, such as the creation of a storage partition (e.g., a logical unit number (LUN)) in step 144. Within a relatively short time following the provisioning request issued by the first provisioning script 116a, a second provisioning script 116b issues a request for a lock to the same resource requested by the first provisioning script 116a at step 146. Nevertheless, because the lock has been previously granted to the first provisioning script 116a, the lock is not immediately granted to the second provisioning script 116b. Thus, the second provisioning script is inhibited from provisioning its associated resource.

In step 148, when provisioning by the first provisioning script 116a is completed, the first provisioning script 116a transmits a release lock message back to the locking service 112, which causes the locking service 112 to release the lock, and transmit a message to the second provisioning script 116b indicating that its request for a lock has been granted in step 150. Thereafter, the second provisioning script 116b may proceed to access the resource manager 114 to provision its associated resource at step 152. When provisioning by the second provisioning script 116b is completed, the second provisioning script 116b transmits a provisioning success message back to the locking service 112, which causes the locking service 112 to release the lock at step 154, thus allowing provisioning by other provisioning scripts 116.

Although the timing diagram of FIG. 1B describes one example of how the locking service 112 may provide a structured sequence of provisioning scripts that are simultaneously executed, it is contemplated that the locking service 112 may provide other techniques of structuring the order in which resources are provisioned. For example, the locking service 112 may issue locks for entities other than that provided through the resource manager 114, such as when provisioning of a virtual object depends upon previous provisioning of its associated physical resource. Additionally, although the structured provisioning of only two provisioning scripts are described, it should be understood that the locking service 112 may manage the simultaneous execution of more than two scripts, such as three or more scripts, without departing from the spirit and scope of the present disclosure.

Figure 2A:
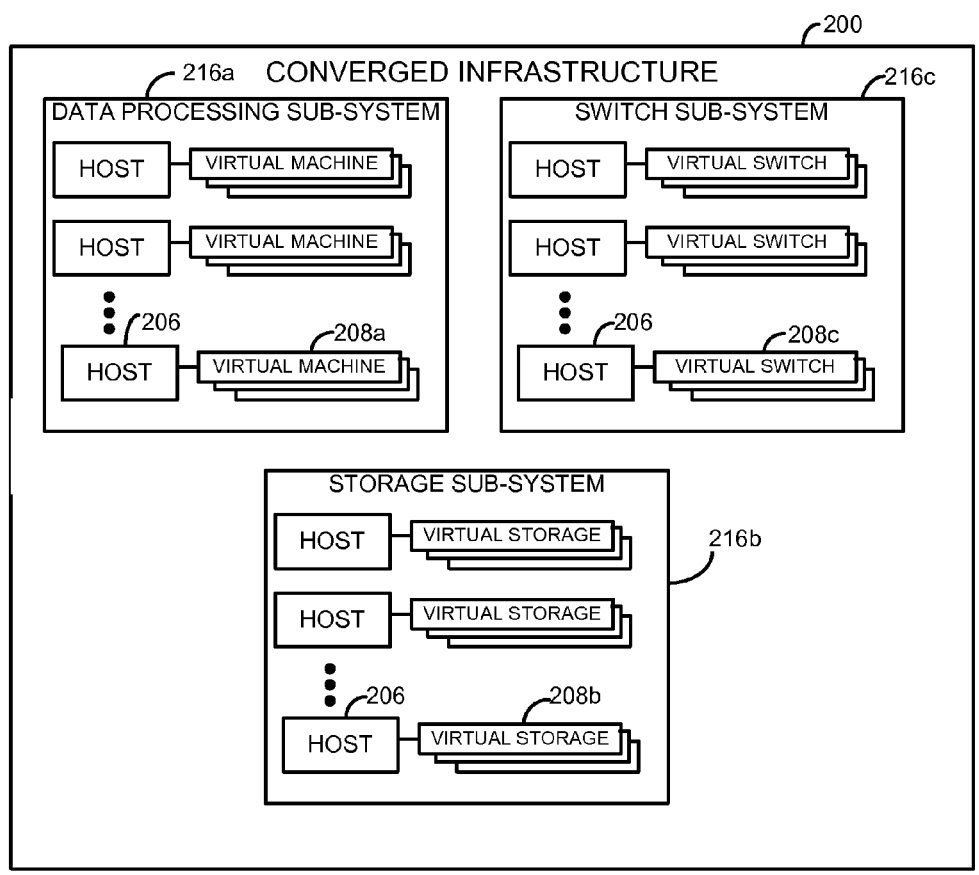
FIGS. 2A and 2B illustrate an example converged infrastructure that may be provisioned by the resource provisioning system of FIG. 1 according to the teachings of the present disclosure.
Figure 2B:
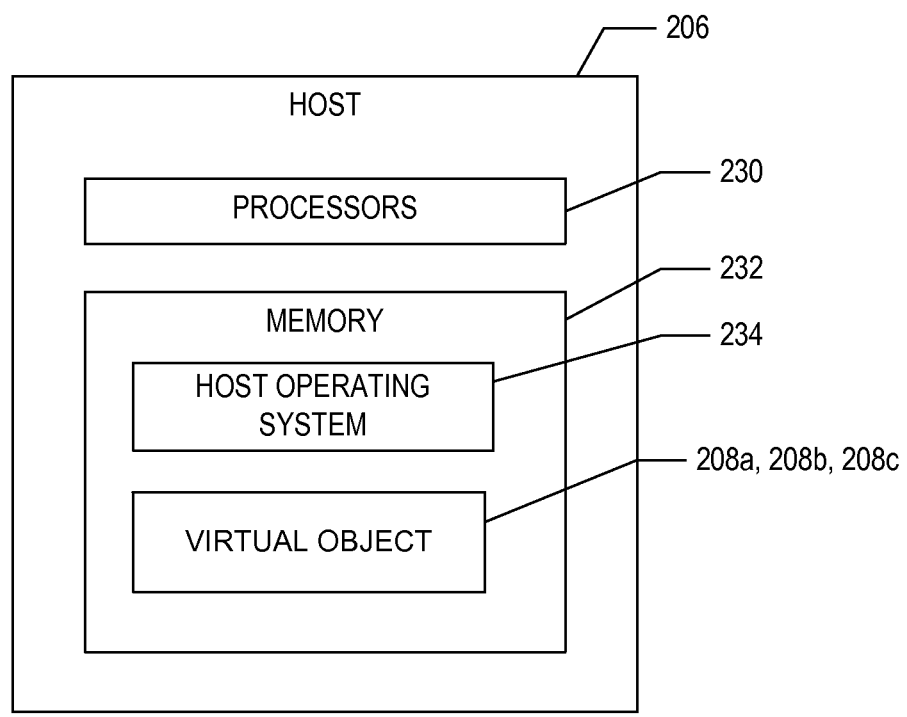

FIGS. 2A and 2B illustrate an example converged infrastructure 200 that may be implemented as the computing environment 120 according to the teachings of the present disclosure. The converged infrastructure 200 may include multiple hosts 206 that each executes one or more virtual objects (e.g., virtual machines 208a, virtual storage objects 208b, and virtual switch objects 208c). The hosts of a converged infrastructure are often referred to as compute servers. Nevertheless in this disclosure, the term host may be interpreted as any physical device and/or component of the converged infrastructure that support the operation of virtual resources and services provided by those virtual resources. The hosts 206 of the converged infrastructure 200 and the virtual objects 208a, 208b, and 208c may be collectively referred to as the resources 122 whose provisioning may be controlled by the provisioning environment 104.

The particular computing environment 120 as shown includes several sub-systems, such as a data processing sub-system 216a, a data storage sub-system 216b, and a switch sub-system 216c. Nevertheless, it should be understood that other computing environments 120 may include additional, fewer, or different types of sub-systems without departing from the spirit and scope of the present disclosure.

In one aspect, each computing environment 120 includes a combination of the previously described sub-systems or other sub-systems that are packaged and interconnected in a standardized manner for ease of maintenance and use. Computing environments such as these are often implemented in environments where relatively high reliability and/or availability are desired, such as in an enterprise environment. Nevertheless, it is contemplated that other computing environments and computing environment, such as a computer cluster, computing grid, blade array, and/or other computing environment may be managed using the teachings of the present disclosure. For example, a computing environment 120 such as that shown includes components found in VBLOCK™ System infrastructure packages available from VCE, LLC, which is headquartered in Richardson, Tex.

In one aspect, the data storage sub-system 216b includes computer-readable memory structures for storing data used by the computing environment 120, which may include network attached storage (NAS) arrays and/or storage area network (SAN) arrays that are associated with virtual objects (e.g., virtual storage objects 208b). The switch sub-system 216c provides for communication among the various sub-systems of the computing environment 120, and may include components, such as fabric interconnect systems, Ethernet switches/routers, multilayer director switches (MDSs), and the like. The data processing sub-system 216a executes applications that access, store, and otherwise manipulate data stored by the computing environment 120. For a particular example, either of the data storage sub-system 216b, the switch sub-system 216c, and/or the data processing sub-system 216a may comprise a blade computing platform having multiple hosts (e.g., blade computing devices) 206 that each executes one or more virtual objects.

Each sub-system includes multiple hosts 206 that each executes one or more virtual objects, which in this particular example, are virtual machines (VMs) 208a, virtual storage objects 208b, and virtual switch objects 208c. For example, virtual objects, such as the VMs 208a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware Corporation, which is headquartered in Palo Alto, Calif.

The hosts 206 of each sub-system 216 generally refer to the hardware resources of the computing infrastructure, while the virtual objects 208 of each sub-system 216 generally refer to virtual resources of the computing infrastructure. Virtual resources may also include one or more logical configuration constructs that may be provisioned by the provisioning environment 106. For example, one type of logical configuration construct includes a tenant partition in which certain resources are allocated for use by each tenant (e.g., user). For example, one tenant partition may dedicate the use of a certain number of virtual machines 208a, virtual switches 208b, and virtual storage units 208c to be used by one tenant, while another tenant partition may dedicate the use of other virtual machines 208a, virtual switches 208b, and virtual storage units 208c. Additionally, each tenant partition may specify certain levels of performance to be maintained by the virtual computing environment, such as a specified level of data throughput to be transmitted through the cloud computing environment, and/or a specified level of processing load to be provided by the cloud computing environment.

FIG. 2B depicts an example host 206 implemented on each converged infrastructure 104 according to one aspect of the operations management system 100. The host 206 is a computing or processing device that includes one or more processors 230 and a memory 232. For example, the host 206 can be a personal computer, such as a laptop or notebook computer, a workstation, or other processing device such as a personal digital assistant or a tablet computer. In a particular embodiment, the host 206 is a rack mounted host, such as blade host in which multiple blade hosts share a common backplane for communication with one another and for receiving power from a rack mounted power distribution unit. The memory 232 stores a host operating system 234 and one or more virtual objects (e.g., VMs 208a, virtual storage objects 208b, and virtual switch objects 208c) defining virtual objects that are executed by the processor 230. The host operating system 232 controls and manages the operation of the virtual objects executed on the host 206. For example, control signaling for starting, stopping, and/or changing operating parameters of each virtual object is managed through the host operating system 234.

Although FIGS. 2A and 2B illustrate a single converged infrastructure may be provisioned by the resource provisioning system 100, it is contemplated that the system 100 may be used to provision multiple converged infrastructures, such as those arranged in a cloud computing environment or other distributed computing environment. One example of such an environment may include multiple converged infrastructures that are deployed at a single location or at different locations for enhanced processing throughput. For another example, multiple converged infrastructures may be deployed at a single location of at different locations to provide redundancy for enhanced reliability and/or availability of the overall computing environment provided thereby. Embodiments of the present disclosure may provide a resource provisioning system that coordinates the provisioning of resources for each of these types of computing environments.

Figure 3:
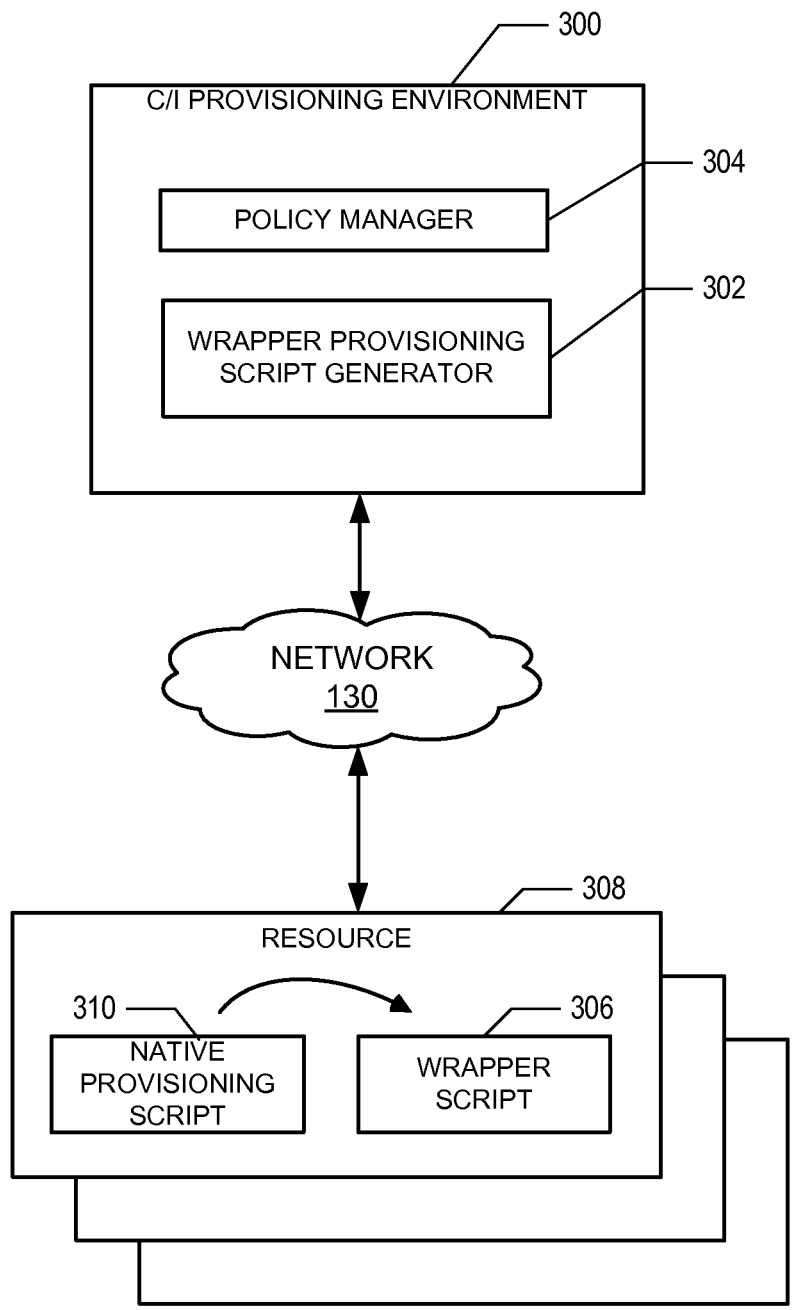
FIG. 3 illustrates another example converged infrastructure provisioning environment according to one embodiment of the present disclosure.

FIG. 3 illustrates an example provisioning environment 300 according to one embodiment of the present disclosure. The provisioning environment 300 may be executed on the management computing system 102 of FIG. 1 and may also include a master script 110, a locking service 112, and a resource manager 114 that are similar in design and construction to that described above with reference to FIG. 1. The provisioning environment 300 also includes a wrapper script generator 302 and a policy manager 304 to generate a wrapper script 306 for each resource (e.g., physical host and/or virtual object) 308 such that dependencies for each resource are properly managed.

As shown, each resource includes a native provisioning script 310 that, when executed, performs various functions for provisioning its associated resource. In many cases, these provisioning scripts include instructions or directives in the form of alpha-numeric text strings that instruct certain actions to be taken by its associated resource, such as installation of a particular application on the resource, setting of one or more parameters associated with the application or resource itself, and the like. For example, the native provisioning script 310 may be written to be executed within the context of a powershell or a bash shell environment of the resource in which it is executed.

Nevertheless, when these native provisioning scripts are executed, they do not readily provide for monitoring of their progress (e.g., what portion of the provisioning script is completed). Additionally, the native provisioning scripts are not readily configured to access resources outside of their own domain (e.g., the resource on which they are executed). It would nevertheless be beneficial to utilize these native provisioning scripts because they can often provision their respective resources more efficiently than may be provided by centrally managed tools. Additionally, these scripts have been customized for use their respective resources such that bugs or errors in its execution have been fixed or corrected over time. The wrapper script generator 302 allows use of these native provisioning scripts, and alleviates the their inherent drawbacks by generating wrapper scripts 308 that each includes the native instructions included in its associated native provisioning script while adding additional instructions for communicating its progress with external provisioning mechanisms, such as the locking service 112 described above in FIGS. 1A and 1B.

For example, the wrapper script generator 302 may read a native provisioning script 310 from a resource 308, identify one or more dependencies from the instructions included in the native provisioning script 310 and generate call routines for each dependency that when executed, communicate with the locking service 112 for ensuring that the dependency is handled properly. The native instructions and generated call routines are then included in the wrapper script 306 and stored in the resource 308 to be executed when the resource is provisioned.

The wrapper script generator 302 may identify the dependencies in any suitable manner. In one embodiment, the wrapper script generator 302 identifies the dependencies using the policy manager 304. For example, when the wrapper script generator 302 encounters a provisioning event to be performed in the native provisioning script 310, it may access the policy manager 304 to identify what if any dependencies exist for provisioning that resource, and what actions are to be taken by the wrapper script 306 for handling those dependencies.

FIGS. 4A through 4E illustrate several example provisioning tasks for provisioning a computing environment according to one embodiment of the present disclosure. As will be described, each of these provisioning tasks may incur certain dependencies that require a structured, sequenced provisioning of resources as provided embodiments of the resource provisioning system 100.

Figure 4A:
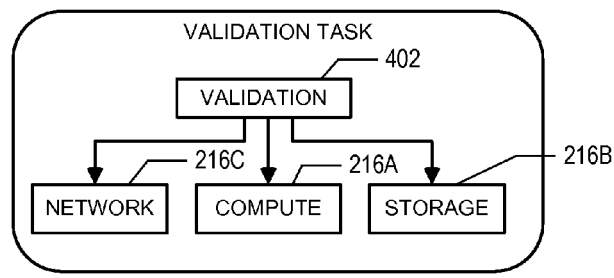
FIGS. 4A through 4E illustrate several example provisioning tasks for provisioning a converged infrastructure according to one embodiment of the present disclosure.

FIG. 4A illustrates an example validation task in which certain core resources, such as the virtual resources (e.g., virtual machines 208a, virtual switches 208c, and virtual storage units 208b) are validated 402. For example, the validation task may involve ensuring that all expected resources are present and in proper operational order. That is, the validation task may ensure that an expected quantity and types of resources are available and that these resources are functioning properly. Additionally, the validation task may include ensuring that any hardware cabling, such as power distribution and/or communication cables (e.g., Ethernet cabling) has been properly installed and is functioning properly.

Figure 4B:
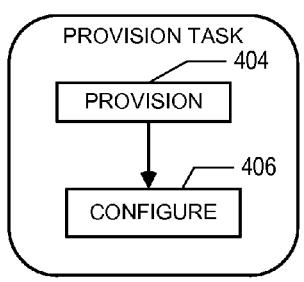

FIG. 4B illustrates an example provisioning task for resources, such as hosts 206 and/or virtual objects 208a, 208b, and 208c of the computing environment 120. In this particular task, provisioning of each resource may involve provisioning the resource (e.g., installing operating system software, installing application software, etc.) 404 followed by configuration of the resource (e.g., configure parameters of operating system and/or application software) 406. In this particular case, configuration of the resource is dependent upon provisioning of the resource in that configuration cannot be performed until the resource is provisioned.

Figure 4C:
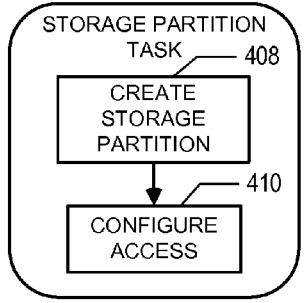

FIG. 4C illustrates an example storage partition initialization (e.g., booting) task in which a storage partition may be allocated for use with the computing environment 120. In this case, the task involves creating a storage partition 408, which may include allocating a logical unit number (LUN) for the partition followed by configuring access for the partition 410, such as assigning an address or a range of addresses that may be used for accessing the storage partition. Thus, configuring access for the storage partition may incur a dependency in which the storage partition must first be created.

Figure 4D:
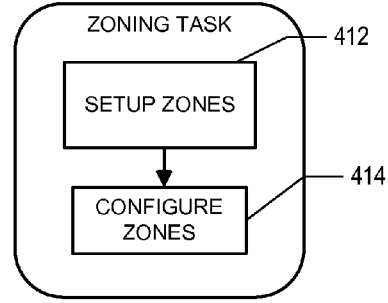

FIG. 4D illustrates an example zoning task in which one or more zones may be generated for isolating certain resources for dedicated use independently of the resources assigned to other zones. For example, a first group of resources may be assigned to a particular zone for a first tenant, while a second group of resources are assigned to another zone for a second tenant. As shown, generation of the zone involves setup of the zone (e.g., allocate certain resources to be included in the zone) 412 followed by configuration of the zone (e.g., configure parameters associated with the allocated zones) 414. In this case, configuration of the zone has a dependency in which the zone must first be setup before it can be configured.

Figure 4E:
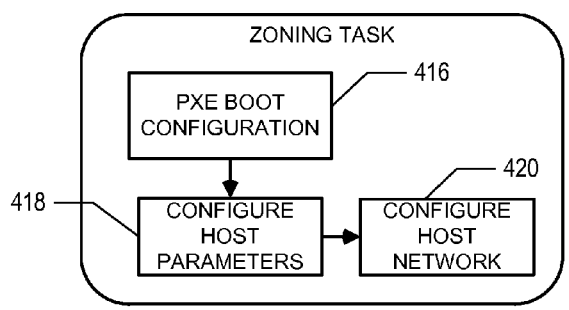

FIG. 4E illustrates an example hypervisor installation task in which various components of a hypervisor may be installed on a hardware resource (e.g., a host 206). Installation of the hypervisor generally involves installation of a preboot execution environment (PXE) 416, configuration of the host parameters 418, and configuration of the host network 420. Configuration of the host network is dependent upon configuration of the host parameters, which is itself dependent upon installation of the PXE environment. Thus, the host network configuration includes a nested dependency in which multiple hierarchal resources are required to be provisioned prior to it being provisioned.

As described above, each of the tasks of FIGS. 4A through 4E may include provisioning resources that include one or more dependencies. Nevertheless, these tasks may include additional dependencies. For example, the provisioning task (FIG. 4B), storage partition task (FIG. 4C), and zoning task (FIG. 4D) may each be dependent upon the validation task (FIG. 4A). That is, the provisioning task, storage partition task, and zoning task require that the validation task be performed prior to these tasks being performed. Furthermore, the hypervisor installation task (FIG. 4E) may be dependent upon the provisioning task, the storage partition task, and the zoning task. That is, the hypervisor installation task requires that the provisioning task, storage partition task, and zoning task be provisioned prior to it being provisioned.

For dependencies such as these, the policy manager 304 (FIG. 3) may be accessed when the wrapper scripts 306 are generated such that the dependencies are managed in a structured, consistent manner. For example, a wrapper script may be generated for a validation task that includes the following pseudo-code instructions:

Create Barrier: validation
Execute native validation script instructions
Remove Barrier: "validation"
Create Latch: "setup", count=3

In this particular wrapper script, the instruction "Create Barrier: validation" generates a call to the locking service that locks out all scripts that are dependent upon provisioning of the validation task. When the native script instructions have been completed, the instruction "Remove Barrier: validation" that instructs the locking service to remove the lock associated with the name 'validation'. Additionally, the instruction "Create Latch: setup" is included to form a barrier that requires the successful completion of a certain quantity of tasks, which according to the specific embodiment above is three tasks, namely the provision task, the boot task, and the zoning task.

An example wrapper script that may be generated for the provision task, the boot task, and the zoning task, respectively, may include the following pseudo-code instructions:

Wait For Barrier: validation
Execute native provision task instructions
Decrement Latch: setup
Wait For Barrier: "validation"
Execute native booting tasks
Decrement Latch: "setup"
Wait For Barrier: "validation"
Execute native zoning tasks
Decrement Latch: "setup"

The instruction "Wait For Barrier: validation" generates a call to the locking service that instructs the locking service to delay granting a lock to the provision task until the validation lock has been removed. The instruction "Decrement Latch: setup" generates a call to the locking service that instructs the locking service to decrement the counter established in the validation task. Therefore, when all three wrapper scripts have been completed, the locking service may remove the lock named setup.

An example wrapper script that may be generated for the hypervisor installation task may include the following pseudo-code instructions:

Wait For Latch: setup
Execute native hypervisor installation tasks

As shown, the wrapper script for the hypervisor installation tasks includes an instruction "Wait For Latch: setup" that generates a call to the locking service that instructs the locking service to delay granting a lock to the hypervisor installation task pending removal of the setup latch. As can be seen from the description above, provisioning of a computing environment may include numerous dependencies that in many cases, can be nested such that provisioning of its resources may be relatively complex endeavor. Embodiments of the present disclosure provide a solution to this problem by managing the dependencies of each resource such that they are provisioned in a systematic and consistent manner.

Figure 5:
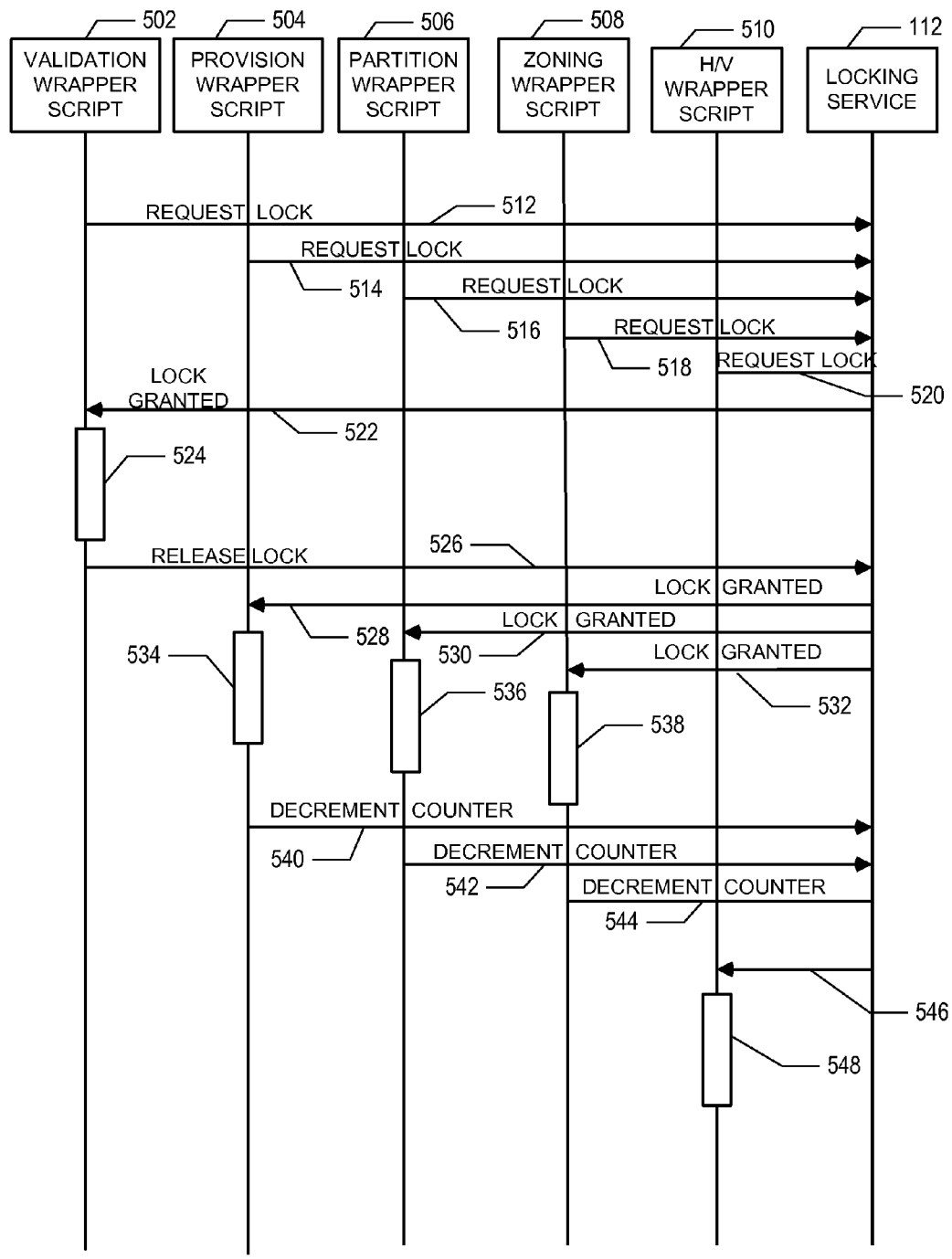
FIG. 5 illustrates an example sequence diagram showing how the wrapper scripts as described above may coordinate the provisioning of the tasks described above with reference to FIGS. 4A through 4E.

FIG. 5 illustrates an example sequence diagram showing how the wrapper scripts as described above may coordinate the provisioning of the tasks described above with reference to FIGS. 4A through 4E. As shown herein, each of a validation wrapper script 502, a provision wrapper script 504, a boot wrapper script 506, a zoning wrapper script 508, and a hypervisor wrapper script 510 may be launched (e.g., commenced execution) at generally the same time by the master script 110. That is, they are executed simultaneously.

In step 512, the validation wrapper script 540 issues a call to the locking service 112 to generate a lock named "validation", which inhibits all other scripts having a barrier from being executed. Thereafter in steps 514, 516, 518, and 520, the provision wrapper script 504, the boot wrapper script 506, the zoning wrapper script 508, and the hypervisor installation wrapper script 510 issue calls to the locking service to wait for the validation lock to be removed.

In step 522, only the validation wrapper script 502 is granted a lock to proceed with its provisioning. As such, the validation wrapper script 502 executes its native provisioning instructions in step 524. In step 526, at completion of the native provisioning instructions, the validation wrapper script 502 transmits a release of the lock named "validation" to the locking service. In response the locking service 112 releases the validation lock and transmits notifications to each script that the validation lock has been released in steps 528, 530, 532 to the provision wrapper script 504, the boot wrapper script 506, and the zoning wrapper script 508, respectively. In steps 534, 536, and 538, the provision wrapper script 504, the boot wrapper script 506, and zoning wrapper script 508, respectively, commence execution of their native instructions. As each script completes its execution, it transmits a decrement instruction for the setup counter previously established for the three scripts in step 540, 542, and 544.

When the locking service 112 has decremented the counter named 'setup' to 0, the setup lock is released and in response, it releases the setup lock and transmits a lock to the hypervisor installation wrapper script 510 to commence its execution in step 546. Thereafter in step 548, the hypervisor installation wrapper script 510 executes its native instructions.

As shown above, the locking service 112 can manage dependencies among multiple numbers of provisioning scripts that may be concurrently executed thereby decreasing the amount of time required for provisioning of a computing environment, while managing any number of dependencies that may otherwise incur data corruption due to the provisioning of any one task being conducted out of sequence with another task.

Although FIG. 5 describes one example of a sequenced process that may be performed by the provisioning environment 106, the features of the disclosed process may be embodied in other specific forms without deviating from the spirit and scope of the present disclosure. For example, the environment 106 may perform additional, fewer, or different operations than those operations as described in the present example. As another example, the steps of the process described herein may be performed by a system other than the computing system 102, which may be, for example, one of the virtual objects executed on the computing environment 120.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium, such as a computer-readable medium, having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
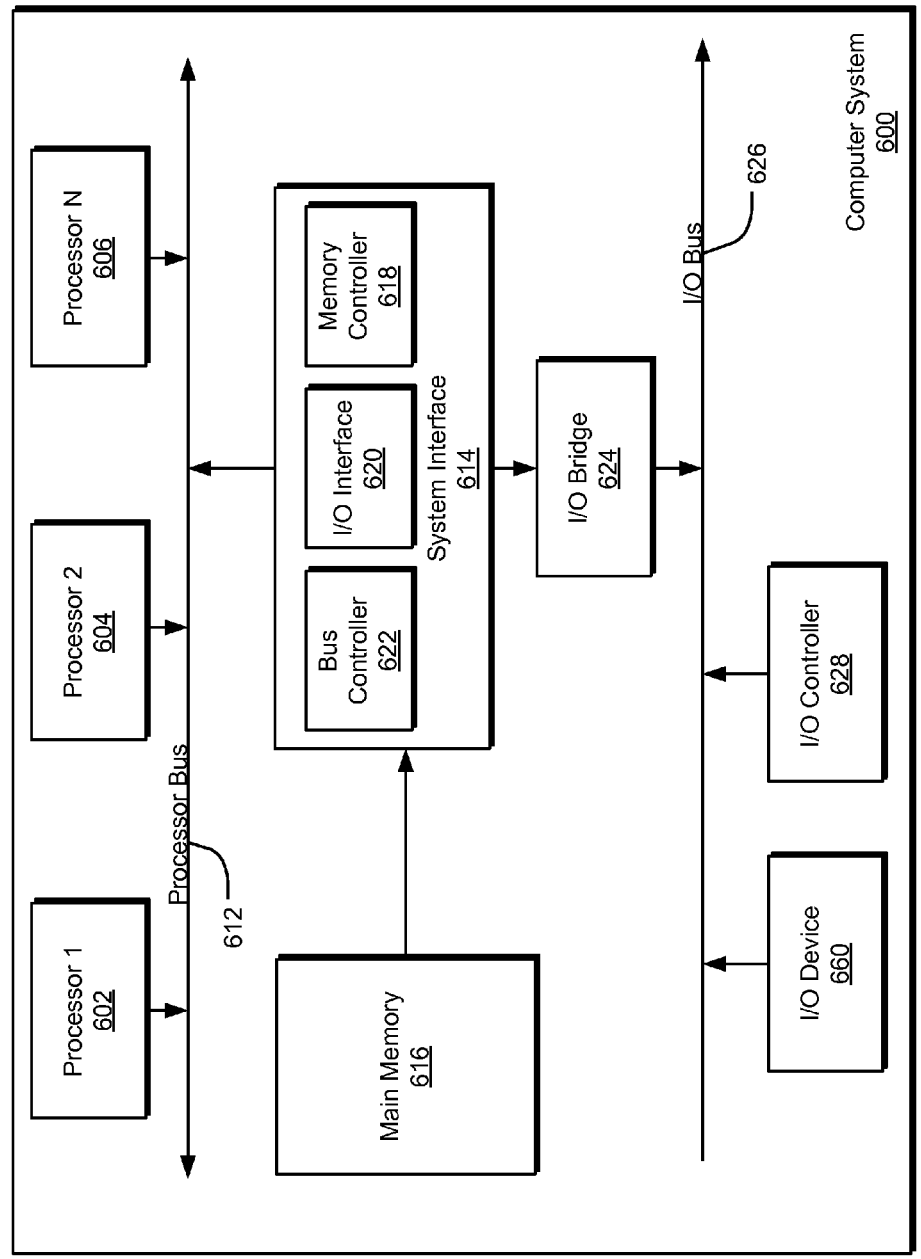
FIG. 6 is a block diagram illustrating an example of a computing device or computer system which may be used in implementing the embodiments of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A computing environment provisioning system comprising:
a computing system comprising at least one processor and at least one memory to store a locking service that is executed by at least one processor to:
receive a plurality of provisioning requests from one or more provisioning scripts for provisioning an associated plurality of resources to be provided by one or more physical hosts or one or more virtual objects of a computing environment, at least one dependent resource being dependent upon operation of at least one other non-dependent resource;
identify the at least one other non-dependent resource that is required to be provisioned prior to the at least one dependent resource being provisioned;
transmit a first lock granted message to a first of the one or more provisioning scripts associated with the other at least one non-dependent resource, the first lock granted message allowing the first provisioning script associated with the other at least one non-dependent resource to provision the other at least one non-dependent resource; and
when a release lock message is received from the first provisioning script associated with the other at least one non-dependent resource, transmit a second lock granted message to a second of the provisioning scripts associated with the at least one dependent resource, the second lock granted message allowing the second provisioning script associated with the at least one dependent resource to provision the at least one dependent resource, wherein the release lock message is transmitted by the first provisioning script when the at least one non-dependent resource has completed provisioning.

2. The computing environment provisioning system of claim 1, wherein the locking service is executed to identify the other at least one non-dependent resource by receiving a locking request including a unique identifier from the second provisioning script associated with the at least one dependent resource, and identifying the unique identifier included in one or more other of the provisioning requests from the other at least one non-dependent resource.

3. The computing environment provisioning system of claim 2, wherein the locking request in included in a message that conforms to a representational state transfer (REST) application program interface (API) specification.

4. The computing environment provisioning system of claim 2, wherein the second provisioning script comprises a wrapper script that includes the locking request and provisioning instructions obtained from a native provisioning script associated with the at least one dependent resource, the locking request generated according to a policy manager that determines what other at least one non-dependent resource that the at least one dependent resource depends upon.

5. The computing environment provisioning system of claim 2, wherein the locking request is configured to inhibit provisioning of the at least one dependent resource until a specified quantity of the other at least one non-dependent resources have been provisioned.

6. The computing environment provisioning system of claim 2, wherein the locking request is configured to inhibit provisioning of a plurality of at least one dependent resources until the other at least one non-dependent resource has been provisioned.

7. The computing environment provisioning system of claim 1, wherein at least one of the first provisioning script or the second provisioning script comprises a set of instructions comprising alpha-numeric text strings that are interpreted when executed by its respective physical host or virtual object.

8. A computing environment provisioning method comprising:
    receiving, by a processing system that executes instructions stored in at least one memory, a plurality of provisioning requests from one or more provisioning scripts for provisioning an associated plurality of resources to be provided by one or more physical hosts or one or more virtual objects of a computing environment, at least one dependent resource being dependent upon operation of at least one other non-dependent resource;
    identifying, by the processing system, the at least one other at least one non-dependent resource that is required to be provisioned prior to the at least one dependent resource being provisioned;
    transmitting, by the processing system, a first lock granted message to a first of the one or more provisioning scripts associated with the other at least one non-dependent resource, the first lock granted message allowing the first provisioning script associated with the other at least one non-dependent resource to provision the other at least one non-dependent resource; and
    when a release lock message is received from the first provisioning script associated with the other at least one non-dependent resource, transmitting, by the processing system, a second lock granted message to a second of the provisioning scripts associated with the at least one dependent resource, the second lock granted message allowing the second provisioning script associated with the at least one dependent resource to provision the at least one dependent resource, wherein the release lock message is transmitted by the first provisioning script when the at least one non-dependent resource has completed provisioning.

9. The method of claim 8, further comprising identifying the other at least one non-dependent resource by receiving a locking request including a unique identifier from the second provisioning script associated with the at least one dependent resource, and identifying the unique identifier included in one or more other of the provisioning requests from the other at least one non-dependent resource.

10. The method of claim 9, further comprising receiving the plurality of provisioning requests that conform to a representational state transfer (REST) application program interface (API) specification.

11. The method of claim 9, further comprising generating a wrapper script comprising the locking request and provisioning instructions obtained from a native provisioning script associated with the at least one dependent resource.

12. The method of claim 11, further comprising generating the locking request according to policy manager that determines what other at least one non-dependent resource that the at least one dependent resource depends upon.

13. The method of claim 9, further comprising inhibiting provisioning of the at least one dependent resource until a specified quantity of the at least one other non-dependent resources have been provisioned.

14. The method of claim 9, further comprising inhibiting provisioning of a plurality of the at least one dependent resources until the other at least one non-dependent resource has been provisioned.

15. A non-transitory machine readable medium including computer executable instructions that, when executed by at least one processor, cause the processor to perform the operations comprising:
    receive a plurality of provisioning requests from one or more provisioning scripts for provisioning an associated plurality of resources to be provided by one or more physical hosts or one or more virtual objects of a computing environment, at least one resource being dependent upon operation of at least one other non-dependent resource;
    identify the at least one other non-dependent resource that is required to be provisioned prior to the at least one dependent resource being provisioned;
    transmit a first lock granted message to a first of the one or more provisioning scripts associated with the other at least one non-dependent resource, the first lock granted message allowing the first provisioning script associated with the other at least one non-dependent resource to provision the other at least one non-dependent resource; and
    when a release lock message is received from the first provisioning script associated with the other at least one non-dependent resource, transmit a second lock granted message to a second of the provisioning scripts associated with the at least one dependent resource, the second lock granted message allowing the second provisioning script associated with the at least one dependent resource to provision the at least one dependent resource, wherein the release lock message is transmitted by the first provisioning script when the at least one non-dependent resource has completed provisioning.

16. The non-transitory machine readable medium of claim 15, the computer executable instructions further operable to perform identifying the other at least one non-dependent resource by receiving a locking request including a unique identifier from the second provisioning script associated with the at least one dependent resource, and identifying the unique identifier included in one or more other of the provisioning requests from the other at least one non-dependent resource.

17. The non-transitory machine readable medium of claim 16, the computer executable instructions further operable to perform generating a wrapper script comprising the locking request and provisioning instructions obtained from a native provisioning script associated with the at least one dependent resource.

18. The non-transitory machine readable medium of claim 16, the computer executable instructions further operable to perform inhibiting provisioning of the at least one dependent resource until a specified quantity of the at least one other non-dependent resources have been provisioned.

* * * * *